(12) United States Patent
Ruder

(10) Patent No.: US 9,770,970 B2
(45) Date of Patent: Sep. 26, 2017

(54) COOLING DEVICE AND COOLING METHOD FOR A ROTOR-INTEGRATED CLUTCH FOR HYBRID MODULES

(71) Applicant: Schaeffler Technologies AG & Co. KG, Herzogenaurach (DE)

(72) Inventor: Willi Ruder, Lahr (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 122 days.

(21) Appl. No.: 14/785,236

(22) PCT Filed: Mar. 24, 2014

(86) PCT No.: PCT/DE2014/200138
§ 371 (c)(1),
(2) Date: Oct. 16, 2015

(87) PCT Pub. No.: WO2014/169913
PCT Pub. Date: Oct. 23, 2014

(65) Prior Publication Data
US 2016/0082825 A1    Mar. 24, 2016

(30) Foreign Application Priority Data
Apr. 19, 2013 (DE) ........................ 10 2013 207 071

(51) Int. Cl.
*B60K 6/22* (2007.10)
*B60K 6/38* (2007.10)
*B60K 6/48* (2007.10)
*F16D 13/72* (2006.01)
*H02K 7/108* (2006.01)
*H02K 9/06* (2006.01)
*H02K 9/19* (2006.01)
(Continued)

(52) U.S. Cl.
CPC .................. *B60K 6/38* (2013.01); *B60K 6/22* (2013.01); *F16D 13/72* (2013.01); *H02K 7/10* (2013.01);
(Continued)

(58) Field of Classification Search
CPC .......... B60K 6/22–6/547; H02K 7/006; H02K 7/108; H02K 9/02–9/28; F16D 13/72;
(Continued)

(56) References Cited

U.S. PATENT DOCUMENTS 6,561,336 B1 * 5/2003 Huart ...................... F02B 63/04
123/179.28
6,814,205 B2 * 11/2004 Feldhaus ................. F16D 13/72
180/165

(Continued)

FOREIGN PATENT DOCUMENTS

DE  10036504 B4    2/2001
DE  102008043367 A1    5/2010
(Continued)

*Primary Examiner* — Richard Lorence
(74) *Attorney, Agent, or Firm* — Simpson & Simpson, PLLC

(57) ABSTRACT

A cooling device for a hybrid module of a motor vehicle, comprising a housing, a driveshaft arranged within the housing, a rotor non-rotatable secured to the driveshaft, a stator secured to the housing, a clutch arranged to engage or disengage the driveshaft, said clutch being integral with the rotor and, a fluid transport device arranged on the driveshaft to transport a fluid to the clutch.

10 Claims, 2 Drawing Sheets

(51) Int. Cl.
  *H02K 7/10* (2006.01)
  *H02K 7/00* (2006.01)
  *B60K 1/00* (2006.01)
(52) U.S. Cl.
  CPC ............... *H02K 7/108* (2013.01); *H02K 9/06* (2013.01); *H02K 9/19* (2013.01); *B60K 2001/006* (2013.01); *B60K 2006/4825* (2013.01); *F16D 2300/0212* (2013.01); *H02K 7/006* (2013.01); *Y02T 10/6252* (2013.01); *Y10S 903/912* (2013.01)
(58) Field of Classification Search
  CPC ......... F16D 2300/0212; Y10S 903/912; Y10S 903/914; Y02T 10/6213–10/6229
  See application file for complete search history.

(56) References Cited

U.S. PATENT DOCUMENTS

| | | | |
|---|---|---|---|
| 2012/0080286 A1* | 4/2012 | Kasuya | B60K 6/40 192/113.3 |
| 2014/0030123 A1* | 1/2014 | Fuechtner | F04D 13/06 417/420 |

FOREIGN PATENT DOCUMENTS

| | | |
|---|---|---|
| DE | 102010063973 A1 | 6/2012 |
| DE | 102011120809 A1 | 6/2013 |
| WO | 2012029441 A1 | 3/2012 |
| WO | 2013054827 A1 | 4/2013 |

\* cited by examiner

COOLING DEVICE AND COOLING METHOD FOR A ROTOR-INTEGRATED CLUTCH FOR HYBRID MODULES

CROSS-REFERENCE TO RELATED APPLICATIONS

The present application is the U.S. national stage application pursuant to 35 U.S.C. §371 of International Application No. PCT/DE2014/200138, filed, Mar. 24, 2014, which application claims priority from German Patent Application No. DE 10 2013 207 071.3, filed Apr. 19, 2013, which applications are incorporated herein by reference in their entireties.

TECHNICAL FIELD

The invention relates to a cooling device and a cooling method for cooling a clutch that is integrated into a rotor of an E-motor of a hybrid module for a motor vehicle and to a hybrid module including such a cooling device.

BACKGROUND

What is known as a hybrid module for a motor vehicle is disclosed in DE 100 36 504 B4, a valuable contribution to the prior art. The document discloses a clutch that is integrated radially inside the rotor of an electric motor to reduce the axial installation space.

A disadvantage of this rotor-integrated arrangement of the clutch is that compared to conventional clutch arrangements, such a rotor-integrated arrangement has a negative effect on the operating properties and functioning of the clutch.

SUMMARY

An object of the invention is to overcome these disadvantages of the prior art.

This object is attained by a cooling device, wherein the cooling device is a cooling device for a clutch integrated in a rotor of a hybrid module for motor vehicles and wherein the cooling device comprises at least one fluid transport device constructed to transport a fluid to the clutch.

The invention allows the clutch to be cooled by a fluid that absorbs and preferably removes the heat created in the clutch. Due to the fluid transport device, a movement of the fluid may be created to reduce or prevent an accumulation of heat in the region of the clutch. In the context of the invention it has been found that there are thermal conditions inside the rotor of the electric motor that have an overall negative effect on the functioning of the clutch since the clutch is subject to greater thermal stress. The integrated design impedes the removal of heat, and due to the rotor-integrated arrangement, the clutch is subject to additional thermal influences of the electric motor. In addition, in certain modes of operation of the hybrid module, more friction energy is introduced into the clutch than in a drive train without such a module, resulting in the development of additional heat. The invention improves the functioning of the clutch on the whole. For instance, the invention prevents or at least reduces increased wear of the friction linings, which has been found to be attributable to higher temperatures in the clutch.

The hybrid module is preferably a module by means of which electrical energy is transferrable as torque to a drive shaft, wherein torque from an internal combustion engine is additionally transferrable to the shaft. The hybrid module preferably has an electrical motor including a rotor, preferably an internal rotor, and a stator. The rotor and stator preferably include magnetic components such as solenoids and/or permanent magnets and/or coils for converting electrical energy into torque. The hybrid module preferably includes a clutch integrated into the rotor.

The clutch is preferably a disconnect clutch, i.e. a releasable clutch, in particular a freewheel/overrunning disconnect clutch. It preferably connects the internal combustion engine and the electrical motor in a disconnectable way. It preferably includes a pressure plate and a clutch disc, wherein one of these two is connected for co-rotation with the rotor, whereas the other one is rotatable relative to the rotor when the clutch is disengaged. The pressure plate and/or the clutch disc preferably include friction linings. The clutch is preferably disposed radially and/or (in terms of the axis of rotation of the rotor) axially inside the rotor, in particular inside the magnetic components of the rotor. It preferably includes a clutch housing, preferably a bell housing, which is preferably connected for co-rotation with the rotor.

The fluid transport device is preferably designed to convert energy into a movement of a fluid (for instance kinetically and/or electrically). In accordance with a particularly preferred aspect, the fluid transport device is designed to transport the fluid to the clutch, causing the fluid to flow around and/or through the clutch, preferably the clutch housing, and/or causing the fluid to flow past the clutch. The fluid transport device is preferably designed also to transport the fluid away from the clutch. The fluid is preferably guidable into direct contact with the pressure plate and/or with the clutch disc and/or with the friction linings and/or is guidable past the pressure plate and/or the clutch disc and/or the friction linings in direct contact with the pressure plate and/or the clutch disc and/or the friction linings. The fluid transport device preferably has as low pressure side on which low pressure is generated by the fluid transport device, and/or a high pressure side on which high pressure is generated by the fluid transport device. The fluid transport device is preferably capable of transporting the fluid from a location between the fluid transport device and the clutch to the clutch by means of high pressure. In accordance with a particularly advantageous aspect, the fluid is transportable from a location between which and the fluid transport device the clutch is disposed into the direction of the clutch by means of low pressure. The fluid transport device is one of or a combination of the following options: a pump, a fan (wheel), a radial fan, an axial fan, an assembly of one or more fluid-guiding elements or flow elements. The term fluid transport device is preferably understood also to include a static guide/influx element, which for instance uses the air flow to guide air from outside the vehicle to the clutch while the vehicle is in motion. The fluid transport device is made of a plastic material, for instance, and/or of aluminum pressure die casting. The fluid transport device is preferably arranged on the hybrid module, preferably on a component, in particular on the rotor of the hybrid module, in such a way that a fluid is transportable to the clutch. The cooling device preferably includes a number of fluid transport devices.

The fluid may be cooling gas, for instance, preferably air.

In accordance with a further cooling device of the invention, the fluid transport device is connected for co-rotation with the rotor. Alternatively, the fluid transport device is connected to the rotor by a transmission device. In both cases, the rotary energy of the rotor is transmittable to the fluid transport device. Thus the fluid transport device does not need any separate power supply or motor. It may thus be arranged in a space-saving way. For instance, it may for instance be fitted onto a rotor shaft and may for instance be a clip-on fan wheel.

In accordance with a further cooling device of the invention, at least one channel is provided. The channel is designed to guide the fluid to the clutch. In this way, fluid is specifically guidable to those clutch elements that tend to overheat. In addition, a channel is a means to keep flow resistance on the lowest possible level. The channel is preferably in fluidic connection with the fluid transport device. The fluid transport device is preferably disposed in the channel. The channel preferably has radial and/or axial regions in terms of the axis of rotation. In these radial and/or axial regions, the fluid flow is radial (radial region) and axial (axial region), respectively. Preferably the channel at least partly consists of free spaces such as bores formed in the housing of the hybrid module and/or of the rotor. The clutch housing in particular has openings, preferably bores and/or cut-outs that act as a channel and guide fluid into and/or out of the clutch housing. The cooling device preferably includes a connected system of multiple channels.

In accordance with a further cooling device of the invention, the channel defines at least one circuit inside the hybrid module. In this way, fluid is guidable towards and away from the clutch at the same time by means of one fluid transport device. The channel preferably defines a closed circuit to prevent fluid from escaping the circuit in an uncontrolled way and new, potentially contaminated fluid from entering the circuit in an uncontrolled way from outside.

In accordance with a further cooling device of the invention, the channel has a fluid infeed connection leading into the hybrid module from outside and/or a fluid removal connection leading out of the hybrid module. In this way the fluid that is present in a different location for cooling purposes, for instance from a different cooling circuit, may be used or a draft of fresh air may be implemented, the fresh air preferably pre-filtered. For this purpose, a filter is preferably provided on the fluid infeed connection. The fluid infeed connection and/or the fluid removal connection are preferably connected to the air conditioning and/or heating device of the vehicle. Cooled air may for instance be fed into the channel via the fluid infeed connection by means of the air conditioning device and/or air that has been heated up by the clutch may be introduced into the vehicle's interior via the fluid removal connection when the interior is to be heated. The temperature of the fluid is preferably controlled by a cooling device provided outside the hybrid module.

In accordance with a further cooling device of the invention, the channel at least partly abuts the wall of another, second channel of the hybrid module, provided to guide a second fluid. In this way, the fluid may be cooled via the wall. In addition, the heat removal capacity of a cooling circuit already present in the hybrid module may be used to remove heat. Thus the fluid is preferably cooled by means of the second channel of the electric motor. The wall, which is preferably a heat conducting wall, is preferably a common wall of the channel and of the second channel. The stator of the hybrid module preferably includes the second channel. The second channel preferably contains a second fluid, which may cool the stator, for instance the magnetic components thereof, in particular the solenoids thereof. A continuous heat conducting wall is preferably located between the channel and the second channel. The fluid and the second fluid are preferably separate from each other to prevent them from mixing. In the bell housing of the clutch, an air flow in which the flowing air is cooled by being guided past the cooling channel of the electric motor is made possible.

In accordance with a further cooling device of the invention, cooling fins that protrude into the channel are disposed on the wall. In this way, the heat exchange between the wall and the fluid and thus the cooling effect on the fluid is increased. The cooling fins are preferably arranged in the flow direction of the fluid as this reduces the flow resistance.

In accordance with a further cooling device of the invention the fluid transport device is further designed to transport the fluid to electrical and/or magnetic components of the rotor and/or the channel at least partly passes such components of the rotor. This is a simple way of cooling even rotor components that potentially overheat. Electric components are preferably those through which a current passes, magnetic components are preferably those that are capable of creating or have a magnetic field. The gap or any gaps present between the rotor and the stator are preferably part of the channel or channel system.

In addition, the object of the invention is attained by a hybrid module for a motor vehicle, wherein the hybrid module has a cooling device of the invention. Compared to other hybrid modules such a hybrid module has improved thermal conditions for the clutch.

In addition, the object of the invention is attained by a cooling method in which a clutch integrated in a rotor of a hybrid module for a motor vehicle is cooled and which comprises the step of transporting a fluid to the clutch by at least one fluid transport device.

Each one of the following methods refers back to one or more methods that have been described before the respective method. Features of the cooling device and hybrid module described above are preferably also present in the method in an analogous way.

In a second cooling method, the fluid transport device is driven by the rotor. In a third cooling method, fluid is guided to the clutch via at least one channel. In a fourth cooling method, the fluid is transported in a channel circuit defined by the channel within the hybrid module. In a fifth cooling method, fluid is transported to the clutch via a fluid infeed connection to the channel and/or is transported away from the clutch and out of the channel via a fluid removal connection. In a sixth cooling method, the fluid is cooled via a wall of another, second channel of the hybrid module, provided to guide a second fluid. In a seventh cooling method, the fluid is transported past cooling fins disposed on the wall. In an eighth cooling method, the fluid is additionally transported to electrical and/or magnetic components of the rotor and/or the fluid is at least partly guided past such components of the rotor via a channel.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
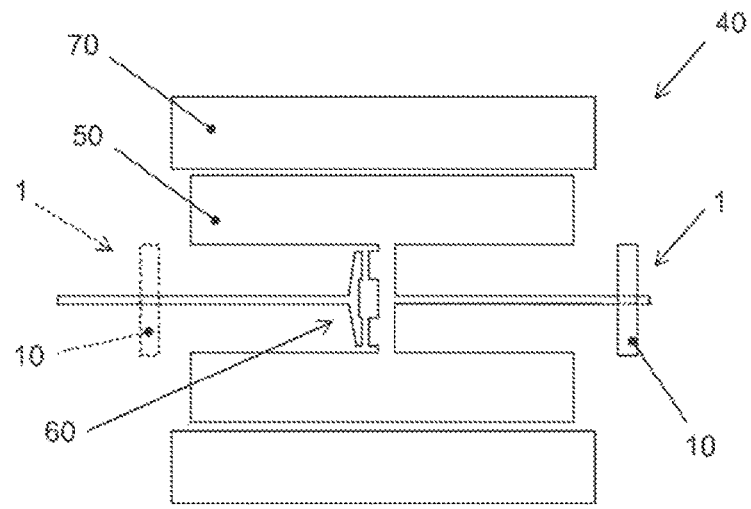
FIG. 1 is a schematic representation of the present invention.

In FIG. 1, a cooling device 1 includes a fluid transport device 10. A hybrid module 40 includes a stator 70, a rotor 50, and a clutch 60 integrated in the rotor 50. The fluid transport device 10 is disposed on a side of the clutch 60, for instance on the transmission side, on the rotor 50. The dashed lines indicate an alternative in which the fluid transport device 10 is disposed on the other side of the clutch 60, for instance on the side of the combustion engine. The fluid transport device 10 is preferably connected for co-rotation with the rotor 50. In the alternative arrangement (indicated in dashed lines), it is connected for co-rotation with the shaft that is driven by the combustion engine.

When the invention is in operation, the fluid transport device 10 transports fluid in the direction of the clutch 60, which is done by sucking fluid out of the region of the clutch 60 to allow new, cooler fluid to flow to the clutch 60 from farther away and/or by guiding fluid from the fluid transport device 10 to the clutch 60 as a result of high pressure generated by the fluid transport device 10. The fluid transport device 10 is preferably driven by the rotation of the rotor 50 or by the rotation of the clutch shaft disposed on the side of the combustion engine (in the dashed embodiment shown on the left-hand side of the drawing).

In this way, heat that is created by friction in the clutch 60, for instance, and is not sufficiently removed due to the construction that surrounds the clutch 60, is absorbed by the fluid at the clutch and may be transported away.

Figure 2:
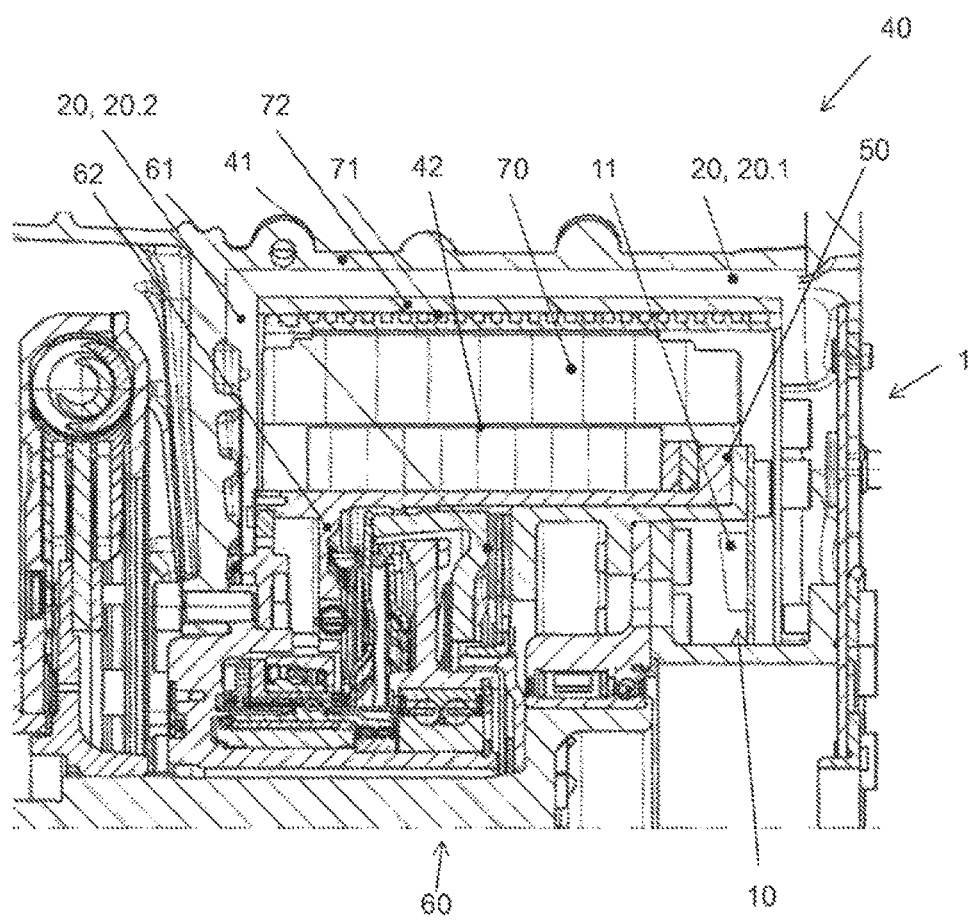
FIG. 2 is a cross-sectional view of the cooling device of the present invention.

The cooling device shown in FIG. 2 includes a channel 20 and a fluid transport device 10 with a flow element 11. The channel 20 has at least one radial section 20.2 and at least one axial section 20.1. The fluid contained in the channel is air. Compared to the hybrid module 40 of FIG. 1, the hybrid module 40 of FIG. 2 additionally includes a hybrid module housing 41 that surrounds the hybrid module 40 and preferably seals the hybrid module 40 in an essentially airtight manner. The channel 20, for instance the upper axial section 20.1 of the channel/the axial channel 20.1, is an axial bore through the hybrid module housing 41. Alternatively or additionally, an axial section 20.1 of the channel 20 is formed by an additional outer shell defining a clear space between itself and the hybrid module housing 41. A radial section 20.2 of the channel 20/a radial channel 20.2 may be formed in an analogous way. A system of fins (for instance a system of radial fins or axial fins), which is usually provided on the hybrid module housing 41 to increase rigidity, for instance, is preferably made use of to form a channel 20 (e.g. a radial or an axial channel 20). The space between such (rigidity) fins preferably forms a channel (e.g. a radial or an axial channel). The stator 70 further includes a stator cooling system provided in the form of mutually adjacent second channels 71 and containing a second fluid, for instance a cooling liquid, for cooling the stator 70. A heat conducting wall 72 preferably has fins 73 on one side (as shown) or more preferably on both sides and separates channel 20 from the second fluid of the stator cooling system. The parallel rectangles that are disposed opposite one another on stator 70 and rotor 40 represent magnetic components of stator 70 and rotor 50, respectively. Compared to FIG. 1, clutch 60 has additional friction linings 61 and a clutch housing 62, preferably a bell housing, which has holes that form a part of the channel 20 and are designed to guide fluid out of and into the clutch housing 62. Between rotor 50 and stator 70, in particular between the magnetic components, there is a gap 42. In accordance with an alternative embodiment, gap 42 is part of channel 20.

Figure 3:
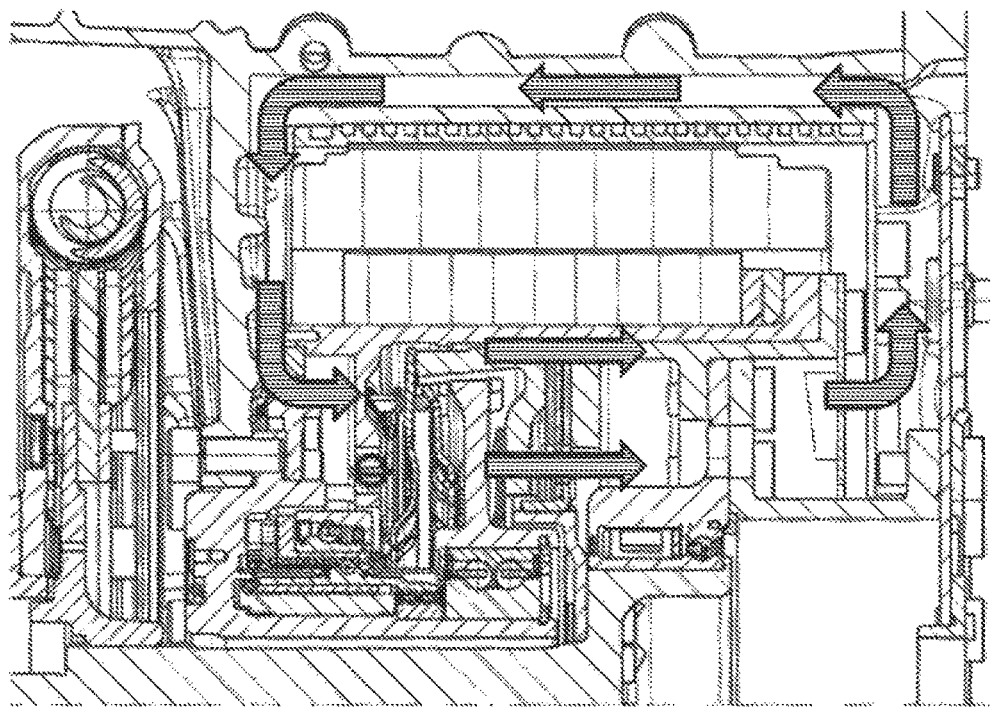
FIG. 3 illustrates a fluid flow path of the cooling device.

The operation of the invention will be explained with reference to FIG. 3, which illustrates the same cooling device 1 and the same hybrid module 40 as FIG. 2, albeit for illustrational reasons without reference numerals. In addition, arrows indicate one example of a movement of the fluid. The movement of flow element 11 of fluid transport device 10 transports fluid in an axial direction. The fluid is deflected into a radial channel 20.2 and then into an axial channel 20.1, where it is transported along wall 72. Wall 72 is cooled by a second fluid circulating in second channel 71 to cool stator 70. The fluid in axial channel 20.1 is cooled on the wall 72. The fluid, which has now been cooled, is transported further into a further radial channel section 20.2 and flows in a radially inward direction. It is then again deflected in an axial direction towards clutch 60 and flows through one or more openings of clutch housing 62, passing the interior of the clutch housing 62 and in particular flowing around friction linings 61 of clutch 60 to absorb the heat that is generated there, before exiting clutch housing 62 through one or more further openings of clutch housing 62 and flowing to fluid transport device 10. From there, the fluid again moves through the aforedescribed circuit. In a (non-illustrated) alternative embodiment, the fluid is additionally transported through gap 42 to cool the magnetic components of stator 70 and rotor 50 and preferably also electrical components that may be present.

In this way, the fluid is transported through a circuit that on the one hand allows the fluid to be cooled by a cooling circuit that is preferably already present in the hybrid module and on the other hand allows heat to be absorbed in the region of clutch 60, in particular in the region of friction linings 61 of the clutch, preferably inside clutch housing 62.

Figure 4:
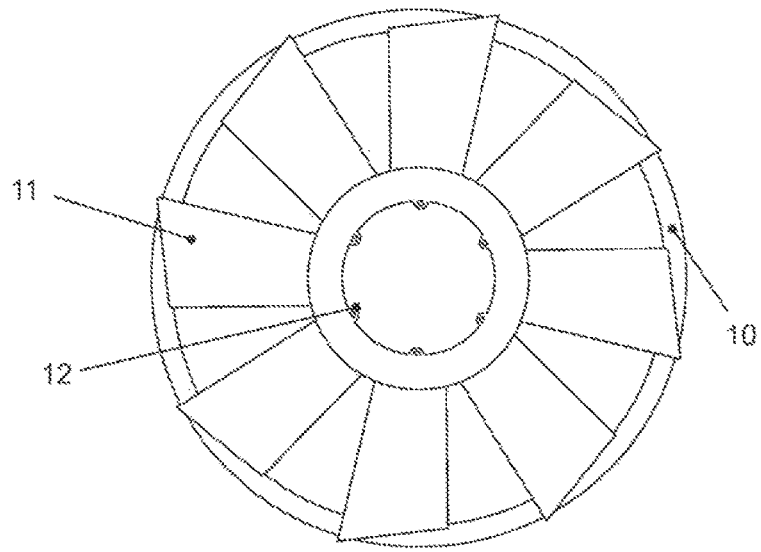
FIG. 4 is a front view of a fluid transport device of the present invention.

In the embodiment shown in FIG. 4, the fluid transport device 10 is a fan wheel including flow elements 11. At least one protrusion 12 is disposed on the hub of fan wheel 10 to allow fan wheel 10 to be fitted onto a shaft for co-rotation therewith, in particular onto the transmission-side rotor shaft of hybrid module 40. To receive fluid transport device 10, a shaft of hybrid module 40 preferably includes at least one corresponding groove.

The present invention for the first time recognizes and addresses the fact that the functioning of a rotor-integrated clutch of the hybrid module is subject to detrimental thermal conditions. For instance, these conditions result in greater wear of the clutch. The invention provides a way to improve the functioning of the clutch. The cooling device and/or cooling method for the first time allows a rotor-integrated clutch of a hybrid module to be cooled, thus improving the overall functioning of the clutch, for instance eliminating or at least reducing wear. A transport device is provided to ensure that the fluid is in motion and absorbs heat preferably in the immediate surroundings of clutch 60, for instance by getting the fluid into direct contact with the bell housing of the clutch or the friction linings. The fluid may preferably be circulated in the hybrid module by the cooling device and by a channel system provided for this purpose. In this way, heat is effectively removed and the fluid is not in danger of being contaminated. In accordance with a particularly preferred aspect, the fluid circulating in the hybrid module is cooled in a location of the hybrid module, for instance by a stator cooling system. The invention allows the motor-side disconnect clutch of a hybrid module and the air in the bell housing to be cooled in the entire hybrid module. The air in the bell housing and, in particular, the friction components of the disconnect clutch are preferably cooled by providing a targeted air flow in the hybrid module due to the action of various rotating elements. The air flow is preferably explicitly guided by the cooling channel of the electric motor, through which a cooling medium flows. Thus the circulating air is specifically cooled, attaining a cooling of the entire air in the bell housing and of the friction elements of the clutch in particular. As the fluid is specifically guided past the rotor and/or stator, the thermal condition in the hybrid module is further improved.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 1 cooling device
10 fluid transport device
11 flow element
12 protrusion
20 channel
20.1 axial channel
20.2 radial channel
40 hybrid module
41 hybrid module housing
42 gap between rotor and stator in the hybrid module
50 rotor
60 clutch
61 friction linings
62 clutch housing
70 stator
71 second channel
72 wall
73 fins

What is claimed is:

1. A cooling device for a hybrid module of a motor vehicle, comprising:
   a housing;
   a driveshaft arranged within said housing;
   a rotor non-rotatably secured to said driveshaft;
   a stator secured to said housing;
   at least one fluid channel, at least in part, radially arranged between the stator and the housing;
   a clutch arranged to engage or disengage said driveshaft, said clutch being integral with said rotor; and,
   a fluid transport device arranged on said driveshaft to transport a first fluid to said clutch.

2. The cooling device recited in claim 1, wherein said fluid transport device is non-rotatably connected to said rotor.

3. The cooling device recited in claim 1, wherein the at least one fluid channel is arranged to guide said first fluid to said clutch.

4. The cooling device recited in claim 3, wherein said at least one fluid channel defines at least one circuit inside said hybrid module.

5. The cooling device recited in claim 4, wherein the fluid transport device is additionally designed to transport the first fluid to electric and/or magnetic components of the rotor and/or wherein the at least one fluid channel at least partly passes such components of the rotor.

6. The cooling device recited in claim 3, wherein said at least one fluid channel has a fluid infeed connection leading into said hybrid module from outside of said hybrid module and/or a fluid removal connection leading out of said hybrid module towards the outside of said hybrid module.

7. The cooling device recited in claim 3, wherein said at least one fluid channel at least partly abuts a wall of a second channel provided in said hybrid module to guide a second fluid.

8. The cooling device recited in claim 7, wherein a plurality of cooling fins protruding into said channels are disposed on said wall.

9. A cooling device for a hybrid module of a motor vehicle, comprising:
   a housing comprising a first fluid channel;
   a driveshaft arranged within said housing;
   a rotor non-rotatably secured to said driveshaft;
   a stator secured to said housing, wherein:
      a first fluid channel is, at least in part, radially arranged between the stator and the housing; and,
      said stator includes a second fluid channel;
   a clutch arranged to engage or disengage said driveshaft, said clutch being integral with said rotor; and,
   a fluid transport device arranged on said driveshaft to transport a fluid to said clutch through said first fluid channel.

10. A method of cooling a hybrid module of a motor vehicle, the method comprising:
    rotating a fluid transport device;
    displacing a first fluid through a first channel by said fluid transport device;
    cooling the first fluid using a second fluid flowing in a second channel arranged adjacent to the first channel; and,
    cooling electric and/or magnetic components of a rotor and a clutch by said first fluid.

* * * * *